US009388829B2

(12) United States Patent
Zhang et al.

(10) Patent No.: US 9,388,829 B2
(45) Date of Patent: Jul. 12, 2016

(54) HYDRAULIC CONTROL SYSTEM HAVING SWING MOTOR ENERGY RECOVERY

(71) Applicant: Caterpillar Inc., Peoria, IL (US)

(72) Inventors: Jiao Zhang, Naperville, IL (US); Lawrence J. Tognetti, Peoria, IL (US); Pengfei Ma, Naperville, IL (US); Dayao Chen, Bolingbrook, IL (US); John Ferraz, Jr., Romeoville, IL (US); Tetsuya Yoshino, Hyogo-ken (JP)

(73) Assignee: Caterpillar Inc., Peoria, IL (US)

( * ) Notice: Subject to any disclaimer, the term of this patent is extended or adjusted under 35 U.S.C. 154(b) by 763 days.

(21) Appl. No.: 13/718,882

(22) Filed: Dec. 18, 2012

(65) Prior Publication Data

US 2014/0060023 A1 Mar. 6, 2014

Related U.S. Application Data

(60) Provisional application No. 61/695,697, filed on Aug. 31, 2012.

(51) Int. Cl.

*F16D 31/02* (2006.01)
*F15B 1/027* (2006.01)
(Continued)

(52) U.S. Cl.

CPC ................ *F15B 1/027* (2013.01); *F15B 1/024* (2013.01); *F15B 21/14* (2013.01);
(Continued)

(58) Field of Classification Search

CPC .................................................... F15B 1/0275
USPC ........................... 60/413, 414, 415, 416, 418
See application file for complete search history.

(56) References Cited

U.S. PATENT DOCUMENTS 2,470,778 A 5/1949 Lankovski et al.
4,665,697 A 5/1987 Dantlgraber
(Continued)

FOREIGN PATENT DOCUMENTS

CN 101151469 3/2008
CN 101960153 1/2011
(Continued)

OTHER PUBLICATIONS

U.S. Patent Application of Rustu Cesur et al. entitled "Hydraulic Control System Having Electronic Flow Limiting" filed on Dec. 18, 2012.
(Continued)

*Primary Examiner* — Nathaniel Wiehe
*Assistant Examiner* — Dustin T Nguyen
(74) *Attorney, Agent, or Firm* — Finnegan, Henderson, Farabow, Garrett & Dunner, LLP

(57) ABSTRACT

A hydraulic control system is disclosed for use in a machine. The hydraulic control system may have a work tool, a motor configured to swing the work tool, a tank, a pump configured to draw fluid from the tank and pressurize the fluid, and a control valve operable to control fluid flow from the pump to the motor and from the motor to the tank via first and second chamber passages to affect motion of the motor. The hydraulic control system may also have an accumulator, and an accumulator circuit configured to selectively direct fluid discharged from the motor to the accumulator for storage and to direct stored fluid from the accumulator to the motor to assist the motor. The hydraulic control system may further have a selector valve configured to selectively connect a higher pressure one of the first and second chamber passages with the accumulator, and a single pressure relief valve disposed within the accumulator circuit and configured to relief pressure from opposing sides of the motor.

18 Claims, 2 Drawing Sheets

(51) Int. Cl.
*F15B 1/02* (2006.01)
*F15B 21/14* (2006.01)

(52) U.S. Cl.
CPC .. *F15B 2211/625* (2013.01); *F15B 2211/6306* (2013.01); *F15B 2211/6313* (2013.01); *F15B 2211/7058* (2013.01); *F15B 2211/88* (2013.01)

(56) References Cited

U.S. PATENT DOCUMENTS

| | | | | | |
|---|---|---|---|---|---|
| 4,731,997 | A * | 3/1988 | Hagin | B60K 6/12 60/405 |
| 4,757,685 | A | 7/1988 | Burckhartzmeyer | |
| 5,067,321 | A | 11/1991 | Miyaoka | |
| 5,197,864 | A | 3/1993 | Lunzman et al. | |
| 5,575,148 | A | 11/1996 | Hirata et al. | |
| 5,622,226 | A | 4/1997 | Hausman et al. | |
| 5,630,316 | A | 5/1997 | Itsuji et al. | |
| 5,692,377 | A | 12/1997 | Moriya et al. | |
| 5,955,706 | A | 9/1999 | Fonkalsrud et al. | |
| 6,009,708 | A | 1/2000 | Miki et al. | |
| 6,058,343 | A | 5/2000 | Orbach et al. | |
| 6,094,911 | A | 8/2000 | Crawshaw | |
| 6,151,894 | A | 11/2000 | Endo et al. | |
| 6,275,757 | B1 | 8/2001 | Watanabe et al. | |
| 6,393,838 | B1 | 5/2002 | Moriya et al. | |
| 6,705,079 | B1 | 3/2004 | Tabor et al. | |
| 6,892,102 | B1 | 5/2005 | Fushimi | |
| 6,981,371 | B2 | 1/2006 | Imanishi et al. | |
| 7,059,125 | B2 | 6/2006 | Oka et al. | |
| 7,059,126 | B2 | 6/2006 | Ma | |
| 7,121,189 | B2 | 10/2006 | Vonderwell et al. | |
| 7,124,576 | B2 | 10/2006 | Cherney et al. | |
| 7,165,950 | B2 | 1/2007 | Fenny et al. | |
| 7,260,931 | B2 | 8/2007 | Egelja et al. | |
| 7,296,404 | B2 | 11/2007 | Pfaff | |
| 7,392,653 | B2 | 7/2008 | Sugano | |
| 7,487,707 | B2 | 2/2009 | Pfaff et al. | |
| 7,596,893 | B2 | 10/2009 | Tozawa et al. | |
| 7,748,279 | B2 | 7/2010 | Budde et al. | |
| 7,823,379 | B2 | 11/2010 | Hamkins et al. | |
| 7,908,852 | B2 | 3/2011 | Zhang et al. | |
| 7,934,329 | B2 | 5/2011 | Mintah et al. | |
| 7,979,181 | B2 | 7/2011 | Clark et al. | |
| 8,020,583 | B2 | 9/2011 | Christensen et al. | |
| 8,850,806 | B2 * | 10/2014 | Zhang | E02F 9/123 60/327 |
| 2004/0055455 | A1 | 3/2004 | Tabor et al. | |
| 2005/0081518 | A1 | 4/2005 | Ma et al. | |
| 2009/0031720 | A1 | 2/2009 | Son | |
| 2009/0217653 | A1 * | 9/2009 | Zhang | E02F 9/2217 60/414 |
| 2011/0302914 | A1 | 12/2011 | Helbling | |
| 2012/0131913 | A1 | 5/2012 | Yoshino et al. | |

FOREIGN PATENT DOCUMENTS

| | | |
|---|---|---|
| EP | 1963686 | 10/2011 |
| GB | 889893 | 9/1960 |
| JP | 56-090159 | 7/1981 |
| JP | 56-131802 | 10/1981 |
| JP | 60-215103 | 10/1985 |
| JP | 63-067403 | 3/1988 |
| JP | 63-167171 | 7/1988 |
| JP | 02-43419 | 2/1990 |
| JP | 03-69861 | 3/1991 |
| JP | 05-287774 | 11/1993 |
| JP | 07119707 | 5/1995 |
| JP | 10-103112 | 4/1998 |
| JP | 2000-213644 | 8/2000 |
| JP | 2004-125094 | 4/2004 |
| JP | 2005-003183 | 1/2005 |
| WO | 2012102654 | 8/2012 |

OTHER PUBLICATIONS

U.S. Patent Application of Jiao Zhang et al. entitled "Hydraulic Control System Having Swing Motor Energy Recovery" filed on Dec. 18, 2012.

U.S. Patent Application of Bryan J. Hillman et al. entitled "Hydraulic Control System Having Swing Motor Energy Recovery" filed on Dec. 18, 2012.

U.S. Patent Application of Rustu Cesur et al. entitled "Hydraulic Control System Having Swing Energy Recovery" filed on Dec. 18, 2012.

U.S. Appl. No. 13/714,064 of Tonglin Shang et al. entitled "Hydraulic Control System Having Swing Oscillation Dampening" filed Dec. 13, 2012.

U.S. Appl. No. 13/714,017 of Randal N. Peterson et al. entitled "Hydraulic Control System Having Over-Pressure Protection" filed Dec. 13, 2012.

U.S. Appl. No. 13/713,988 of Rustu Cesur et al. entitled "Adaptive Work Cycle Control System" filed Dec. 13, 2012.

U.S. Appl. No. 13/170,960 of Pengfei Ma et al. entitled "Hydraulic Control System Having Energy Recovery Kit" filed Jun. 28, 2011.

U.S. Appl. No. 13/171,007 of Pengfei Ma et al. entitled "Hydraulic Control System Having Swing Energy Recovery" filed Jun. 28, 2011.

U.S. Appl. No. 13/171,047 of Jiao Zhang et al. entitled "Hydraulic Control System Having Swing Motor Energy Recovery" filed Jun. 28, 2011.

U.S. Appl. No. 13/171,110 of Jiao Zhang et al. entitled "Hydraulic Control System Having Swing Motor Energy Recovery" filed Jun. 28, 2011.

U.S. Appl. No. 13/171,146 of Jiao Zhang et al. entitled "Energy Recovery System Having Accumulator and Variable Relief" filed Jun. 28, 2011.

* cited by examiner

HYDRAULIC CONTROL SYSTEM HAVING SWING MOTOR ENERGY RECOVERY

RELATED APPLICATIONS

This application is based on and claims the benefit of priority from U.S. Provisional Application No. 61/695,697, filed Aug. 31, 2012, the contents of which are expressly incorporated herein by reference.

TECHNICAL FIELD

The present disclosure relates generally to a hydraulic control system and, more particularly, to a hydraulic control system having swing motor energy recovery.

BACKGROUND

Swing-type excavation machines, for example hydraulic excavators and front shovels, require significant hydraulic pressure and flow to transfer material from a dig location to a dump location. These machines direct the high-pressure fluid from an engine-driven pump through a swing motor to accelerate a loaded work tool at the start of each swing, and then restrict the flow of fluid exiting the motor at the end of each swing to slow and stop the work tool.

One problem associated with this type of hydraulic arrangement involves efficiency. In particular, the fluid exiting the swing motor at the end of each swing is under a relatively high pressure due to deceleration of the loaded work tool. Unless recovered, energy associated with the high-pressure fluid may be wasted. In addition, restriction of this high-pressure fluid exiting the swing motor at the end of each swing can result in heating of the fluid, which must be accommodated with an increased cooling capacity of the machine.

One attempt to improve the efficiency of a swing-type machine is disclosed in U.S. Pat. No. 7,908,852 of Zhang et al. that issued on Mar. 22, 2011 (the '852 patent). The '852 patent discloses a hydraulic control system for a machine that includes an accumulator. The accumulator stores exit oil from a swing motor that has been pressurized by inertia torque applied on the moving swing motor by an upper structure of the machine. The pressurized oil in the accumulator is then selectively reused to accelerate the swing motor during a subsequent swing by supplying the accumulated oil back to the swing motor.

Although the hydraulic control system of the '852 patent may help to improve efficiencies of a swing-type machine in some situations, it may still be less than optimal. In particular, during discharge of the accumulator described in the '852 patent, some pressurized fluid exiting the swing motor may still have useful energy that is wasted. In addition, there may be situations during operation of the hydraulic control system of the '852 patent, for example during deceleration and accumulator charging, when a pump output is unable to supply fluid at a rate sufficient to prevent cavitation in the swing motor. Further, the machine may operate differently under different conditions and in different situations, and the hydraulic control system of the '852 patent is not configured to adapt control to these conditions and situations.

The disclosed hydraulic control system is directed to overcoming one or more of the problems set forth above and/or other problems of the prior art.

SUMMARY

One aspect of the present disclosure is directed to a hydraulic control system. The hydraulic control system may include a work tool, a motor configured to swing the work tool, a tank, a pump configured to draw fluid from the tank and pressurize the fluid, and a control valve operable to control fluid flow from the pump to the motor and from the motor to the tank via first and second chamber passages to affect motion of the motor. The hydraulic control system may also include an accumulator, and an accumulator circuit configured to selectively direct fluid discharged from the motor to the accumulator for storage and to direct stored fluid from the accumulator to the motor to assist the motor. The hydraulic control system may further include a selector valve configured to selectively connect a higher pressure one of the first and second chamber passages with the accumulator, and a single pressure relief valve disposed within the accumulator circuit and configured to relief pressure from opposing sides of the motor.

Another aspect of the present disclosure is directed to a method of operating a hydraulic control system. The method may include drawing fluid from a tank and pressurizing the fluid with a pump. The method may also include directing the pressurized fluid from the pump to a motor and from the motor to the tank to drive the motor, and selectively directing fluid from the motor to an accumulator and from the accumulator back to the motor. The method may further include selectively directing fluid from both sides of the motor to the tank via a single relief valve based on a pressure of the fluid.

DETAILED DESCRIPTION

Figure 1:
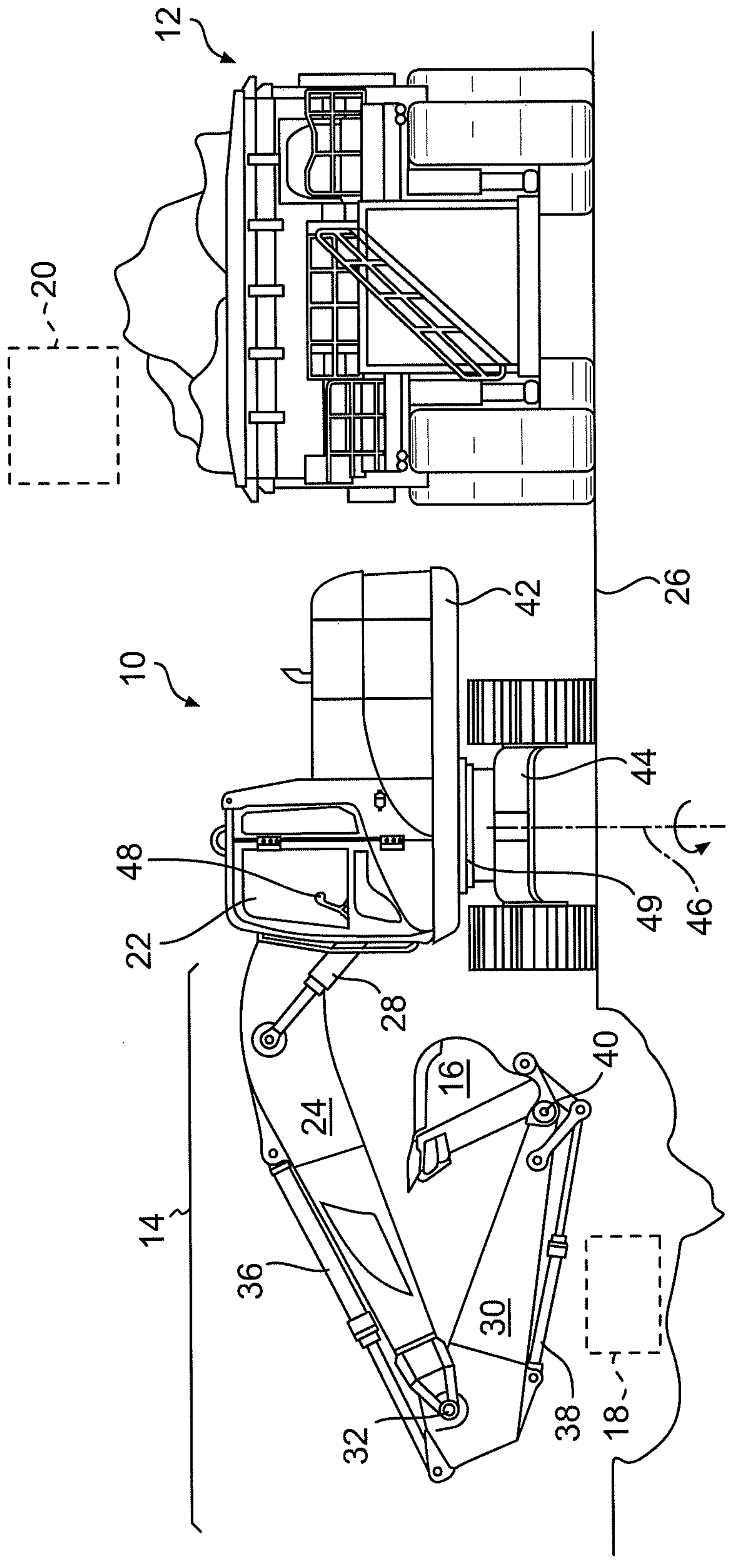
FIG. 1 is a diagrammatic illustration of an exemplary disclosed machine operating at a worksite with a haul vehicle.

FIG. 1 illustrates an exemplary machine 10 having multiple systems and components that cooperate to excavate and load earthen material onto a nearby haul vehicle 12. In one example, machine 10 may embody a hydraulic excavator. It is contemplated, however, that machine 10 may embody another swing-type excavation or material handling machine such as a backhoe, a front shovel, a dragline excavator, or another similar machine. Machine 10 may include, among other things, an implement system 14 configured to move a work tool 16 between a dig location 18 within a trench or at a pile, and a dump location 20, for example over haul vehicle 12. Machine 10 may also include an operator station 22 for manual control of implement system 14. It is contemplated that machine 10 may perform operations other than truck loading, if desired, such as craning, trenching, and material handling.

Implement system 14 may include a linkage structure acted on by fluid actuators to move work tool 16. Specifically, implement system 14 may include a boom 24 that is vertically pivotal relative to a work surface 26 by a pair of adjacent, double-acting, hydraulic cylinders 28 (only one shown in FIG. 1). Implement system 14 may also include a stick 30 that is vertically pivotal about a horizontal pivot axis 32 relative to boom 24 by a single, double-acting, hydraulic cylinder 36. Implement system 14 may further include a single, double-acting, hydraulic cylinder 38 that is operatively connected between work tool 16 and stick 30 and functional to tilt work tool 16 vertically about a horizontal pivot axis 40. Boom 24 may be pivotally connected to a frame 42 of machine 10, while frame 42 may be pivotally connected to an undercarriage member 44 and swung about a vertical axis 46 by a swing motor 49. Stick 30 may pivotally connect work tool 16 to boom 24 by way of pivot axes 32 and 40. It is contemplated that a greater or lesser number of fluid actuators may be included within implement system 14 and/or connected in a manner other than described above, if desired.

Numerous different work tools 16 may be attachable to a machine 10 and controllable via operator station 22. Work tool 16 may include any device used to perform a particular task such as, for example, a bucket, a fork arrangement, a blade, a shovel, or any other task-performing device known in the art. Although connected in the embodiment of FIG. 1 to lift, swing, and tilt relative to machine 10, work tool 16 may alternatively or additionally rotate, slide, extend, or move in another manner known in the art.

Operator station 22 may be configured to receive input from a machine operator indicative of a desired work tool movement. Specifically, operator station 22 may include one or more input devices 48 embodied, for example, as single or multi-axis joysticks located proximal an operator seat (not shown). Input devices 48 may be proportional-type controllers configured to position and/or orient work tool 16 by producing a work tool position signal that is indicative of a desired work tool speed and/or force in a particular direction. The position signal may be used to actuate any one or more of hydraulic cylinders 28, 36, 38 and/or swing motor 49. It is contemplated that different input devices may alternatively or additionally be included within operator station 22 such as, for example, wheels, knobs, push-pull devices, switches, pedals, and other operator input devices known in the art.

Figure 2:
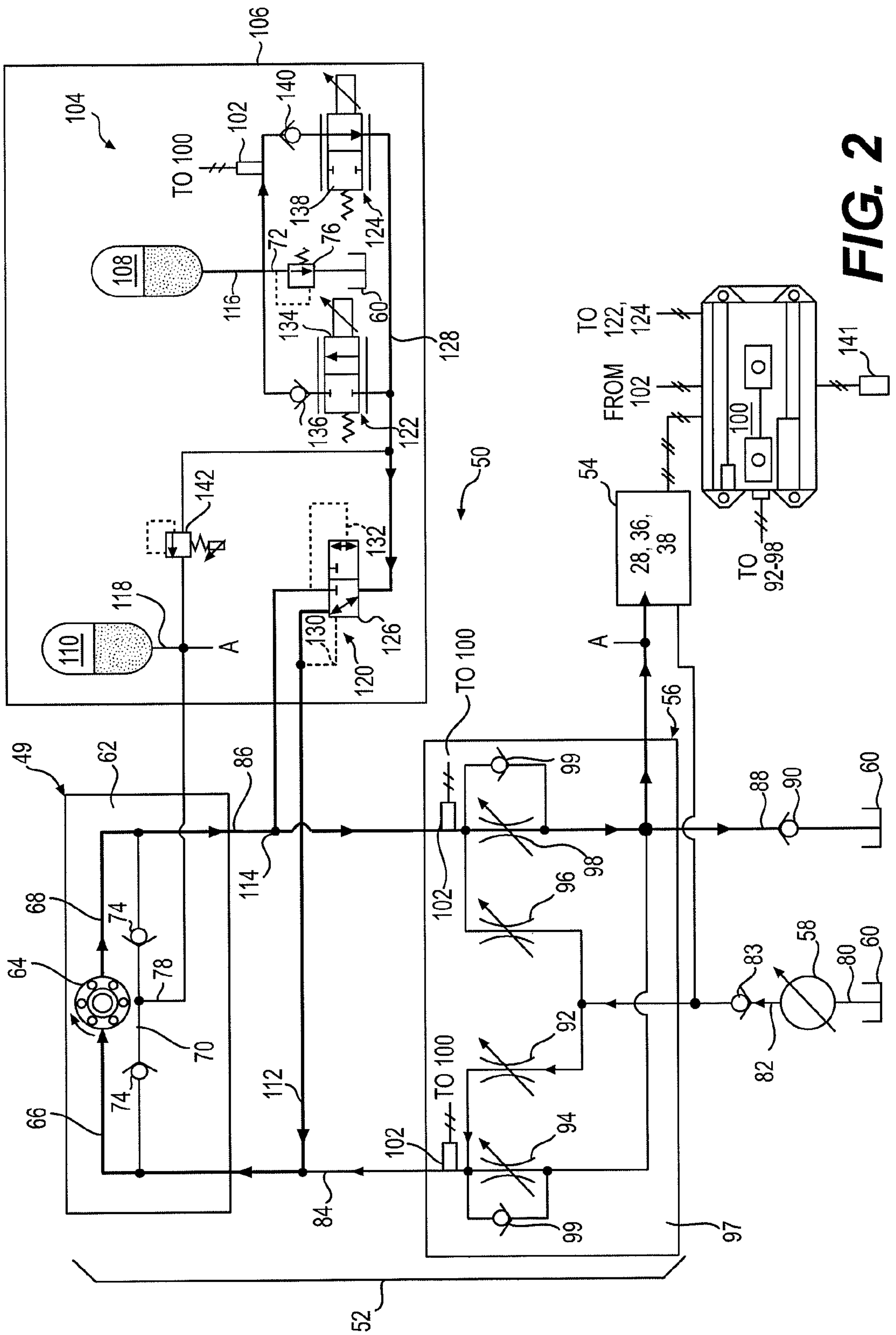
FIG. 2 is a schematic illustration of an exemplary disclosed hydraulic control system that may be used with the machine of FIG. 1.

As illustrated in FIG. 2, machine 10 may include a hydraulic control system 50 having a plurality of fluid components that cooperate to move implement system 14 (referring to FIG. 1). In particular, hydraulic control system 50 may include a first circuit 52 associated with swing motor 49, and at least a second circuit 54 associated with hydraulic cylinders 28, 36, and 38. First circuit 52 may include, among other things, a swing control valve 56 connected to regulate a flow of pressurized fluid from a pump 58 to swing motor 49 and from swing motor 49 to a low-pressure tank 60 to cause a swinging movement of work tool 16 about vertical axis 46 (referring to FIG. 1) in accordance with an operator request received via input device 48. Second circuit 54 may include similar control valves, for example a boom control valve (not shown), a stick control valve (not shown), a tool control valve (not shown), a travel control valve (not shown), and/or an auxiliary control valve connected in parallel to receive pressurized fluid from pump 58 and to discharge waste fluid to tank 60, thereby regulating the corresponding actuators (e.g., hydraulic cylinders 28, 36, and 38).

Swing motor 49 may include a housing 62 at least partially forming a first and a second chamber (not shown) located to either side of an impeller 64. When the first chamber is connected to an output of pump 58 (e.g., via a first chamber passage 66 formed within housing 62) and the second chamber is connected to tank 60 (e.g., via a second chamber passage 68 formed within housing 62), impeller 64 may be driven to rotate in a first direction (shown in FIG. 2). Conversely, when the first chamber is connected to tank 60 via first chamber passage 66 and the second chamber is connected to pump 58 via second chamber passage 68, impeller 64 may be driven to rotate in an opposite direction (not shown). The flow rate of fluid through impeller 64 may relate to a rotational speed of swing motor 49, while a pressure differential across impeller 64 may relate to an output torque thereof.

Swing motor 49 may include built-in makeup functionality. In particular, a makeup passage 70 may be formed within housing 62, between first chamber passage 66 and second chamber passage 68, and a pair of opposing check valves 74 may be disposed within makeup passage 70. A low-pressure passage 78 may be connected to makeup passage 70 at a location between check valves 74. Based on a pressure differential between low-pressure passage 78 and first and second chamber passages 66, 68, one of check valves 74 may open to allow fluid from low-pressure passage 78 into the lower-pressure one of the first and second chambers. A significant pressure differential may generally exist between the first and second chambers during a swinging movement of implement system 14.

Pump 58 may be configured to draw fluid from tank 60 via an inlet passage 80, pressurize the fluid to a desired level, and discharge the fluid to first and second circuits 52, 54 via a discharge passage 82. A check valve 83 may be disposed within discharge passage 82, if desired, to provide for a unidirectional flow of pressurized fluid from pump 58 into first and second circuits 52, 54. Pump 58 may embody, for example, a variable displacement pump (shown in FIG. 1), a fixed displacement pump, or another source known in the art. Pump 58 may be drivably connected to a power source (not shown) of machine 10 by, for example, a countershaft (not shown), a belt (not shown), an electrical circuit (not shown), or in another suitable manner. Alternatively, pump 58 may be indirectly connected to the power source of machine 10 via a torque converter, a reduction gear box, an electrical circuit, or in any other suitable manner. Pump 58 may produce a stream of pressurized fluid having a pressure level and/or a flow rate determined, at least in part, by demands of the actuators within first and second circuits 52, 54 that correspond with operator requested movements. Discharge passage 82 may be connected within first circuit 52 to first and second chamber passages 66, 68 via swing control valve 56 and first and second chamber conduits 84, 86, respectively, which extend between swing control valve 56 and swing motor 49.

Tank 60 may constitute a reservoir configured to hold a low-pressure supply of fluid. The fluid may include, for example, a dedicated hydraulic oil, an engine lubrication oil, a transmission lubrication oil, or any other fluid known in the art. One or more hydraulic systems within machine 10 may draw fluid from and return fluid to tank 60. It is contemplated that hydraulic control system 50 may be connected to multiple separate fluid tanks or to a single tank, as desired. Tank 60 may be fluidly connected to swing control valve 56 via a drain passage 88, and to first and second chamber passages 66, 68 via swing control valve 56 and first and second chamber conduits 84, 86, respectively. Tank 60 may also be connected to low-pressure passage 78 (see connection points "A"). A check valve 90 may be disposed within drain passage 88, if desired, to promote a unidirectional flow of fluid into tank 60.

Swing control valve 56 may have elements that are movable to control the rotation of swing motor 49 and corresponding swinging motion of implement system 14. Specifically, swing control valve 56 may include a first chamber supply element 92, a first chamber drain element 94, a second chamber supply element 96, and a second chamber drain element 98 all disposed within a common block or housing 97. First and second chamber supply elements 92, 96 may be connected in parallel with discharge passage 82 to regulate filling of their respective chambers with fluid from pump 58, while first and second chamber drain elements 94, 98 may be connected in parallel with drain passage 88 to regulate draining of the respective chambers of fluid. A makeup valve 99, for example a check valve, may be disposed between an outlet of first chamber drain element 94 and first chamber conduit 84 and between an outlet of second chamber drain element 98 and second chamber conduit 86.

To drive swing motor 49 to rotate in the first direction (shown in FIG. 2), first chamber supply element 92 may be shifted to allow pressurized fluid from pump 58 to enter the first chamber of swing motor 49 via discharge passage 82 and first chamber conduit 84, while second chamber drain element 98 may be shifted to allow fluid from the second chamber of swing motor 49 to drain to tank 60 via second chamber conduit 86 and drain passage 88. To drive swing motor 49 to rotate in the opposite direction, second chamber supply element 96 may be shifted to communicate the second chamber of swing motor 49 with pressurized fluid from pump 58, while first chamber drain element 94 may be shifted to allow draining of fluid from the first chamber of swing motor 49 to tank 60. It is contemplated that both the supply and drain functions of swing control valve 56 (i.e., of the four different supply and drain elements) may alternatively be performed by a single valve element associated with the first chamber and a single valve element associated with the second chamber or by a single valve element associated with both the first and second chambers, if desired.

Supply and drain elements 92-98 of swing control valve 56 may be solenoid-movable against a spring bias in response to a flow rate command issued by a controller 100. In particular, swing motor 49 may rotate at a velocity that corresponds with the flow rate of fluid into and out of the first and second chambers. Accordingly, to achieve an operator-desired swing velocity, a command based on an assumed or measured pressure may be sent to the solenoids (not shown) of supply and drain elements 92-98 that causes them to open an amount corresponding to the necessary flow rate through swing motor 49. This command may be in the form of a flow rate command or a valve element position command that is issued by controller 100.

Controller 100 may be in communication with the different components of hydraulic control system 50 to regulate operations of machine 10. For example, controller 100 may be in communication with the elements of swing control valve 56 in first circuit 52 and with the elements of control valves (not shown) associated with second circuit 54. Based on various operator input and monitored parameters, as will be described in more detail below, controller 100 may be configured to selectively activate the different control valves in a coordinated manner to efficiently carry out operator requested movements of implement system 14.

Controller 100 may include a memory, a secondary storage device, a clock, and one or more processors that cooperate to accomplish a task consistent with the present disclosure. Numerous commercially available microprocessors can be configured to perform the functions of controller 100. It should be appreciated that controller 100 could readily embody a general machine controller capable of controlling numerous other functions of machine 10. Various known circuits may be associated with controller 100, including signal-conditioning circuitry, communication circuitry, and other appropriate circuitry. It should also be appreciated that controller 100 may include one or more of an application-specific integrated circuit (ASIC), a field-programmable gate array (FPGA), a computer system, and a logic circuit configured to allow controller 100 to function in accordance with the present disclosure.

The operational parameters monitored by controller 100, in one embodiment, may include a pressure of fluid within first and/or second circuits 52, 54. For example, one or more pressure sensors 102 may be strategically located in fluid communication with first chamber and/or second chamber conduits 84, 86 to sense a pressure of the respective passages and generate a corresponding signal indicative of the pressure directed to controller 100. It is contemplated that any number of pressure sensors 102 may be placed in any location within first and/or second circuits 52, 54, as desired. It is further contemplated that other operational parameters such as, for example, speeds, temperatures, viscosities, densities, etc. may also or alternatively be monitored and used to regulate operation of hydraulic control system 50, if desired.

Hydraulic control system 50 may be fitted with an energy recovery arrangement (ERA) 104 that is in communication with at least first circuit 52 and configured to selectively extract and recover energy from waste fluid that is discharged from swing motor 49. ERA 104 may include, among other things, a recovery valve block (RVB) 106 that is fluidly connectable between pump 58 and swing motor 49, a first accumulator 108 configured to selectively communicate with swing motor 49 via RVB 106, and a second accumulator 110 also configured to selectively communicate with swing motor 49. In the disclosed embodiment, RVB 106 may be fixedly and mechanically connectable to one or both of swing control valve 56 and swing motor 49, for example directly to housing 62 and/or directly to housing 97. RVB 106 may include an internal first passage 112 fluidly connectable to first chamber conduit 84, and an internal second passage 114 fluidly connectable to second chamber conduit 86. First accumulator 108 may be fluidly connected to RVB 106 via a conduit 116, while second accumulator 110 may be fluidly connectable to low-pressure passage 78 via a conduit 118.

RVB 106 may house a selector valve 120, a charge valve 122 associated with first accumulator 108, a discharge valve 124 associated with first accumulator 108 and disposed in parallel with charge valve 122, and a relief valve 76. Selector valve 120 may selectively fluidly communicate one of first and second passages 112, 114 with charge and discharge valves 122, 124 based on a pressure of first and second passages 112, 114. Charge and discharge valves 122, 124 may be movable in response to commands from controller 100 to selectively fluidly communicate first accumulator 108 with selector valve 120 for fluid charging and discharging purposes. Relief valve 76 may selectively connect an outlet of first accumulator 108 and/or a downstream side of charge valve 122 with tank 60 to relieve pressures of hydraulic control system 50.

Selector valve 120 may be a pilot-operated, 2-position, 3-way valve that is movable in response to fluid pressure in first and second passages 112, 114 (i.e., in response to a fluid pressure within the first and second chambers of swing motor 49). In particular, selector valve 120 may include a valve element 126 that is movable from a first position (shown in FIG. 2) at which first passage 112 is fluidly connected to charge and discharge valves 122, 124 via an internal passage 128, toward a second position (not shown) at which second passage 114 is fluid connected to charge and discharge valves 122, 124 via passage 128. Passage 128 may also be connected to second accumulator 110 and makeup valves 74 via low-pressure passage 78 (i.e., low-pressure passage 78 may terminate at passage 128). When first passage 112 is fluidly connected to charge and discharge valves 122, 124 via passage 128, fluid flow through second passage 114 may be inhibited by selector valve 120 and vice versa. First and second pilot passages 130, 132 may communicate fluid from first and second passages 112, 114, respectively, to opposing ends of valve element 126 such that a higher-pressure one of first or second passages 112, 114 may cause valve element

126 to move and fluidly connect the corresponding passage with charge and discharge valves 122, 124 via passage 128.

Charge valve 122 may be a solenoid-operated, variable position, 2-way valve that is movable in response to a command from controller 100 to allow fluid from passage 128 to enter first accumulator 108. In particular, charge valve 122 may include a valve element 134 that is movable from a first position (shown in FIG. 2) at which fluid flow from passage 128 into first accumulator 108 is inhibited, toward a second position (not shown) at which passage 128 is fluidly connected to first accumulator 108. When valve element 134 is away from the first position (i.e., in the second position or in another position between the first and second positions) and a fluid pressure within passage 128 exceeds a fluid pressure within first accumulator 108, fluid from passage 128 may fill (i.e., charge) first accumulator 108. Valve element 134 may be spring-biased toward the first position and movable in response to a command from controller 100 to any position between the first and second positions to thereby vary a flow rate of fluid from passage 128 into first accumulator 108. A check valve 136 may be disposed between charge valve 122 and first accumulator 108 to provide for a unidirectional flow of fluid into first accumulator 108 via charge valve 122.

Discharge valve 124 may be substantially identical to charge valve 122 in composition, and movable in response to a command from controller 100 to allow fluid from first accumulator 108 to enter passage 128 (i.e., to discharge). In particular, discharge valve 124 may include a valve element 138 that is movable from a first position (not shown) at which fluid flow from first accumulator 108 into passage 128 is inhibited, toward a second position (shown in FIG. 2) at which first accumulator 108 is fluidly connected to passage 128. When valve element 138 is away from the first position (i.e., in the second position or in another position between the first and second positions) and a fluid pressure within first accumulator 108 exceeds a fluid pressure within passage 128, fluid from first accumulator 108 may flow into passage 128. Valve element 138 may be spring-biased toward the first position and movable in response to a command from controller 100 to any position between the first and second positions to thereby vary a flow rate of fluid from first accumulator 108 into passage 128. A check valve 140 may be disposed between first accumulator 108 and discharge valve 124 to provide for a unidirectional flow of fluid from accumulator 108 into passage 128 via discharge valve 124.

Relief valve 76 may be disposed within a relief passage 72 that is in fluid communication with an outlet of charge valve 122, an inlet of discharge valve 124, and first accumulator 108. Based on a pressure of first accumulator 108 (or a pressure of the fluid passing through charge valve 122 and/or entering discharge valve 124) relief valve 76 may open to allow the high-pressure fluid to spill into tank 60. It is contemplated that a manual valve (not shown) may be associated with relief valve 76 (e.g., disposed within a bypass passage connected at inlet and outlet ends of relief valve 76) may be provided, if desired, to facilitate manual draining of first accumulator 108.

In some embodiments, an additional valve 142 may be disposed between passage 128 and makeup passage 70 (e.g., within low-pressure passage 78), to help regulate the flow of makeup fluid to makeup valves 74. In particular, valve 142 may be movable from a first position at which flow from passage 128 to low-pressure passage 78 is blocked, toward a second position at which flow is allowed to pass between the two passages. Valve 142 may be movable from the first position toward the second position based on a pressure within passage 128 (e.g., when a pressure within passage 128 exceeds a threshold pressure of valve 142). When valve 142 is in the first position, makeup fluid may only be provided to makeup passage 70 from second accumulator 110. However, when valve 142 is in the second position, makeup fluid may be provided from both second accumulator 110 and from passage 128 (i.e., from first accumulator 108 via passage 128). In addition, it may be possible for second accumulator 110 to be charged with fluid from passage 128 (i.e., charged with fluid from first accumulator 108), via valve 142. It is contemplated that the pressure at which valve 142 moves from the first position to the second position may be variable, if desired, as is shown in FIG. 2.

An additional pressure sensor 102 may be associated with first accumulator 108 and configured to generate signals indicative of a pressure of fluid within first accumulator 108, if desired. In the disclosed embodiment, the additional pressure sensor 102 may be disposed between first accumulator 108 and discharge valve 124. It is contemplated, however, that the additional pressure sensor 102 may alternatively be disposed between first accumulator 108 and charge valve 122 or directly connected to first accumulator 108, if desired. Signals from the additional pressure sensor 102 may be directed to controller 100 for use in regulating operation of charge and/or discharge valves 122, 124.

First and second accumulators 108, 110 may each embody pressure vessels filled with a compressible gas that are configured to store pressurized fluid for future use by swing motor 49. The compressible gas may include, for example, nitrogen, argon, helium, or another appropriate compressible gas. As fluid in communication with first and second accumulators 108, 110 exceeds predetermined pressures of first and second accumulators 108, 110, the fluid may flow into first and second accumulators 108, 110. Because the gas therein is compressible, it may act like a spring and compress as the fluid flows into first and second accumulators 108, 110. When the pressure of the fluid within conduits 116, 118 drops below the predetermined pressures of first and second accumulators 108, 110, the compressed gas may expand and urge the fluid from within first and second accumulators 108, 110 to exit. It is contemplated that first and second accumulators 108, 110 may alternatively embody membrane/spring-biased or bladder types of accumulators, if desired.

In the disclosed embodiment, first accumulator 108 may be a larger (e.g., about 5-20 times larger) and higher-pressure (e.g., about 5-60 times higher-pressure) accumulator, as compared to second accumulator 110. Specifically, first accumulator 108 may be configured to accumulate up to about 50-100 L of fluid having a pressure in the range of about 260-315 bar, while second accumulator 110 may be configured to accumulate up to about 10 L of fluid having a pressure in the range of about 5-30 bar. In this configuration, first accumulator 108 may be used primarily to assist the motion of swing motor 49 and to improve machine efficiencies, while second accumulator may be used primarily as a makeup accumulator to help reduce a likelihood of voiding at swing motor 49. It is contemplated, however, that other volumes and pressures may be accommodated by first and/or second accumulators 108, 110, if desired.

Controller 100 may be configured to selectively cause first accumulator 108 to charge and discharge, thereby improving performance of machine 10. In particular, a typical swinging motion of implement system 14 instituted by swing motor 49 may consist of segments of time during which swing motor 49 is accelerating a swinging movement of implement system 14 and segments of time during which swing motor 49 is decelerating the swinging movement of implement system 14. The acceleration segments may require significant energy from swing motor 49 that is conventionally realized by way of pressurized fluid supplied to swing motor 49 by pump 58, while the deceleration segments may produce significant energy in the form of pressurized fluid that is conventionally wasted through discharge to tank 60. Both the acceleration and deceleration segments may require swing motor 49 to convert significant amounts of hydraulic energy to kinetic energy, and vice versa. After pressurized fluid passes through swing motor 49, however, it still contains a large amount of energy. If the fluid passing through swing motor 49 is selectively collected within first accumulator 108 during the deceleration segments, this energy can then be returned to (i.e., discharged) and reused by swing motor 49 during the ensuing acceleration segments. Swing motor 49 can be assisted during the acceleration segments by selectively causing first accumulator 108 to discharge pressurized fluid into the higher-pressure chamber of swing motor 49 (via discharge valve 124, passage 128, selector valve 120, and the appropriate one of first and second chamber conduits 84, 86), alone or together with high-pressure fluid from pump 58, thereby propelling swing motor 49 at the same or greater acceleration and velocity with less pump power than otherwise possible via pump 58 alone. Swing motor 49 can be assisted during the deceleration segments by selectively causing first accumulator 108 to charge with fluid exiting swing motor 49, thereby providing additional resistance to the motion of swing motor 49 and lowering a restriction and cooling requirement of the fluid exiting swing motor 49.

In an alternative embodiment, controller 100 may be configured to selectively control charging of first accumulator 108 with fluid exiting pump 58, as opposed to fluid exiting swing motor 49. That is, during a peak-shaving or economy mode of operation, controller 100 may be configured to cause accumulator 108 to charge with fluid exiting pump 58 (e.g., via swing control valve 56, the appropriate one of first and second chamber conduits 84, 86, selector valve 120, passage 128, and charge valve 122) when pump 58 has excess capacity (i.e., a capacity greater than required by swing motor 49 to complete a current swing of work tool 16 requested by the operator). Then, during times when pump 58 has insufficient capacity to adequately power swing motor 49, the high-pressure fluid previously collected from pump 58 within first accumulator 108 may be discharged in the manner described above to assist swing motor 49.

Controller 100 may be configured to regulate the charging and discharging of first accumulator 108 based on a current or ongoing segment of the excavation work cycle of machine 10. In particular, based on input received from one or more performance sensors 141, controller 100 may be configured to partition a typical work cycle performed by machine 10 into a plurality of segments, for example, into a dig segment, a swing-to-dump acceleration segment, a swing-to-dump deceleration segment, a dump segment, a swing-to-dig acceleration segment, and a swing-to-dig deceleration segment. Based on the segment of the excavation work cycle currently being performed, controller 100 may selectively cause first accumulator 108 to charge or discharge, thereby assisting swing motor 49 during the acceleration and deceleration segments.

One or more maps relating signals from performance sensor(s) 141 to the different segments of the excavation work cycle may be stored within the memory of controller 100. Each of these maps may include a collection of data in the form of tables, graphs, and/or equations. In one example, threshold speeds, cylinder pressures, and/or operator input (e.g., lever position) associated with the start and/or end of one or more of the segments may be stored within the maps. In another example, threshold forces and/or actuator positions associated with the start and/or end of one or more of the segments may be stored within the maps. Controller 100 may be configured to reference the signals from performance sensor(s) 141 with the maps stored in memory to determine the segment of the excavation work cycle currently being executed, and then regulate the charging and discharging of first accumulator 108 accordingly. Controller 100 may allow the operator of machine 10 to directly modify these maps and/or to select specific maps from available relationship maps stored in the memory of controller 100 to affect segment partitioning and accumulator control, as desired. It is contemplated that the maps may additionally or alternatively be automatically selectable based on modes of machine operation, if desired.

Performance sensor(s) 141 may be associated with the generally horizontal swinging motion of work tool 16 imparted by swing motor 49 (i.e., the motion of frame 42 relative to undercarriage member 44). For example, sensor 141 may embody a rotational position or speed sensor associated with the operation of swing motor 49, an angular position or speed sensor associated with the pivot connection between frame 42 and undercarriage member 44, a local or global coordinate position or speed sensor associated with any linkage member connecting work tool 16 to undercarriage member 44 or with work tool 16 itself, a displacement sensor associated with movement of operator input device 48, or any other type of sensor known in the art that may generate a signal indicative of a swing position, speed, force, or other swing-related parameter of machine 10. The signal generated by performance sensor(s) 141 may be sent to and recorded by controller 100 during each excavation work cycle. It is contemplated that controller 100 may derive a swing speed based on a position signal from sensor 141 and an elapsed period of time, if desired.

Alternatively or additionally, performance sensor(s) 141 may be associated with the vertical pivoting motion of work tool 16 imparted by hydraulic cylinders 28 (i.e., associated with the lifting and lowering motions of boom 24 relative to frame 42). Specifically, sensor 141 may be an angular position or speed sensor associated with a pivot joint between boom 24 and frame 42, a displacement sensor associated with hydraulic cylinders 28, a local or global coordinate position or speed sensor associated with any linkage member connecting work tool 16 to frame 42 or with work tool 16 itself, a displacement sensor associated with movement of operator input device 48, or any other type of sensor known in the art that may generate a signal indicative of a pivoting position or speed of boom 24. It is contemplated that controller 100 may derive a pivot speed based on a position signal from sensor 141 and an elapsed period of time, if desired.

In yet an additional embodiment, performance sensor(s) 141 may be associated with the tilting force of work tool 16 imparted by hydraulic cylinder 38. Specifically, sensor 141 may be a pressure sensor associated with one or more chambers within hydraulic cylinder 38 or any other type of sensor known in the art that may generate a signal indicative of a tilting force of machine 10 generated during a dig and dump operation of work tool 16.

It should be noted that controller 100 may be limited during the charging and discharging of first accumulator 108 by fluid pressures within first chamber conduit 84, second chamber conduit 86, and first accumulator 108. That is, even though a particular segment in the work cycle of machine 10 during a particular mode of operation may call for charging or discharging of first accumulator 108, controller 100 may only be allowed to implement the action when the related pressures have corresponding values. For example, if pressure sensor 102 indicates that a pressure of fluid within first accumulator 108 is below a pressure of fluid within first chamber conduit 84, controller 100 may not be allowed to initiate discharge of first accumulator 108 into first chamber conduit 84. Similarly, if pressure sensor 102 indicates that a pressure of fluid within second chamber conduit 86 is less than a pressure of fluid within first accumulator 108, controller 100 may not be allowed to initiate charging of first accumulator 108 with fluid from second chamber conduit 86.

During the discharging of pressurized fluid from first accumulator 108 to swing motor 49, the fluid exiting swing motor 49 may still have an elevated pressure that, if allowed to drain into tank 60, may be wasted. At this time, second accumulator 110 may be configured to charge with fluid exiting swing motor 49 any time that first accumulator 108 is discharging fluid to swing motor 49. In addition, during the charging of first accumulator 108, it may be possible for swing motor 49 to receive too little fluid from pump 58 and, unless otherwise accounted for, the insufficient supply of fluid from pump 58 to swing motor 49 under these conditions could cause swing motor 49 to cavitate. Accordingly, second accumulator 110 may be configured to discharge to swing motor 49 any time that first accumulator 108 is charging with fluid from swing motor 49.

As described above, second accumulator 110 may discharge fluid any time a pressure within low-pressure passage 78 falls below the pressure of fluid within second accumulator 110. Accordingly, the discharge of fluid from second accumulator 110 into first circuit 52 may not be directly regulated via controller 100. However, because second accumulator 110 may charge with fluid from first circuit 52 whenever the pressure within drain passage 88 exceeds the pressure of fluid within second accumulator 110, and because swing control valve 56 may affect the pressure within drain passage 88, controller 100 may have some control over the charging of second accumulator 110 with fluid from first circuit 52 via swing control valve 56.

In some situations, it may be possible for both first and second accumulators 108, 110 to simultaneously charge with pressurized fluid. These situations may correspond, for example, with operation in the peak-shaving modes. In particular, it may be possible for second accumulator 110 to simultaneously charge with pressurized fluid when pump 58 is providing pressurized fluid to both swing motor 49 and to first accumulator 108. At these times, the fluid exiting pump 58 may be directed into first accumulator 108, while the fluid exiting swing motor 49 may be directed into second accumulator 110.

Second accumulator 110 may also be charged via second circuit 54, if desired. In particular, any time waste fluid from second circuit 54 (i.e., fluid draining from second circuit 54 to tank 60) has a pressure greater than the threshold pressure of second accumulator 110, the waste fluid may be collected within second accumulator 110. In a similar manner, pressurized fluid within second accumulator 110 may be selectively discharged into second circuit 54 when the pressure within second circuit 54 falls below the pressure of fluid collected within second accumulator 110.

INDUSTRIAL APPLICABILITY

The disclosed hydraulic control system may be applicable to any excavation machine that performs a substantially repetitive work cycle, which involves swinging movements of a work tool. The disclosed hydraulic control system may help to improve machine performance and efficiency by assisting swinging acceleration and deceleration of the work tool during different segments of the work cycle based on a current mode of operation. Specifically, the disclosed hydraulic control system may partition the work cycle into segments and, based on the current mode of operation, selectively store pressurized waste fluid or release the stored fluid to assist movement of a swing motor during the partitioned segments.

Several benefits may be associated with the disclosed hydraulic control system. First, because hydraulic control system 50 may utilize a high-pressure accumulator and a low-pressure accumulator (i.e., first and second accumulators 108, 110), fluid discharged from swing motor 49 during acceleration segments of the excavation work cycle may be recovered within second accumulator 110. This double recovery of energy may help to increase the efficiency of machine 10. Second, the use of second accumulator 110 may help to reduce the likelihood of voiding at swing motor 49. Third, the ability to adjust accumulator charging and discharging based on a current segment of the excavation work cycle and/or based on a current mode of operation, may allow hydraulic control system 50 to tailor swing performance of machine 10 for particular applications, thereby enhancing machine performance and/or further improving machine efficiency.

The disclosed hydraulic control system may also have a compact design. In particular, the location and configuration of selector valve 120 may allow for fluid pressure relief from two opposing sides of swing motor 49 with relief valve 76. In addition to reducing the size and complexity of hydraulic control system 50, the use of a single relief valve may also reduce a cost and improve a reliability thereof.

It will be apparent to those skilled in the art that various modifications and variations can be made to the disclosed hydraulic control system. Other embodiments will be apparent to those skilled in the art from consideration of the specification and practice of the disclosed hydraulic control system. It is intended that the specification and examples be considered as exemplary only, with a true scope being indicated by the following claims and their equivalents.

What is claimed is:

1. A hydraulic control system, comprising:
- a work tool;
- a motor configured to swing the work tool;
- a tank;
- a pump configured to draw fluid from the tank and pressurize the fluid;
- a control valve operable to control fluid flow from the pump to the motor and from the motor to the tank via first and second chamber passages to affect motion of the motor;
- an accumulator;
- an accumulator circuit configured to selectively direct fluid discharged from the motor to the accumulator for storage and to direct stored fluid from the accumulator to the motor to assist the motor;
- a selector valve configured to selectively connect a higher pressure one of the first and second chamber passages with the accumulator;
- a single pressure relief valve disposed within the accumulator circuit and configured to relieve pressure from opposing sides of the motor;
- a charge valve directly connected to the selector valve and fluidly connected to the accumulator; and
- a discharge valve directly connected to the selector valve and fluidly connected to the accumulator in parallel with the charge valve, wherein the single pressure relief valve is fluidly connected with each of the accumulator, the charge valve, the discharge valve, and the tank.

2. The hydraulic control system of claim 1, wherein the single pressure relief valve is movable from a first flow-blocking position to a second flow-passing position in response to a pressure of fluid passing through any one of the charge valve, the discharge valve, and the accumulator.

3. The hydraulic control system of claim 1, wherein the single pressure relief valve is configured to selectively connect each of the charge valve, the discharge valve, and the accumulator with the tank in parallel.

4. The hydraulic control system of claim 1, wherein:

the accumulator is a first accumulator; and the hydraulic control system further includes a second accumulator fluidly connected to discharge fluid to the first and second chamber passages via first and second makeup valves.

5. The hydraulic control system of claim 4, wherein the second accumulator is further fluidly connected to receive fluid from the first and second chamber passages.

6. The hydraulic control system of claim 4, wherein the second accumulator is further fluidly connected to the selector valve.

7. The hydraulic control system of claim 6, further including a pressure-actuated valve fluidly connected between the selector valve and the second accumulator.

8. The hydraulic control system of claim 7, wherein the second accumulator is further fluidly connected to the charge and discharge valves via the pressure-actuated valve.

9. The hydraulic control system of claim 4, wherein:

the first accumulator is configured to accumulate about 50-100 L of fluid having a pressure of about 260-315 bar; and the second accumulator is configured to accumulate about 10 L of fluid having a pressure of about 5-30 bar.

10. The hydraulic control system of claim 4, wherein second accumulator is configured to receive fluid from the first accumulator.

11. The hydraulic control system of claim 4, wherein:

the motor and the control valve are connected to the pump via a first circuit;

the hydraulic control system further includes at least one additional hydraulic actuator and at least one additional control valve connected to the at least one additional hydraulic actuator via a second circuit; and the first and second accumulators are configured to receive fluid from the second circuit.

12. The hydraulic control system of claim 1, wherein the pump is configured to charge the accumulator when the pump has a capacity of fluid greater than required by the motor.

13. A method of operating a hydraulic control system, comprising:

drawing fluid from a tank and pressurizing the fluid with a pump;

directing the pressurized fluid from the pump to a motor and from the motor to the tank to drive the motor;

selectively directing fluid from the motor to an accumulator including directing pressurized fluid to a selector valve, and directing pressurized fluid directly from the selector valve to a charge valve;

selectively directing fluid from the accumulator back to the motor including directing pressurized fluid to a discharge valve, and directing pressurized fluid directly from the discharge valve to the selector valve; and selectively directing fluid from both sides of the motor to the tank via a single relief valve based on a pressure of the fluid.

14. The method of claim 13, wherein:

the accumulator is a first accumulator; and the method further includes directing pressurized fluid from the motor to a second accumulator and from the second accumulator to the motor.

15. The method of claim 14, further including directing pressurized fluid from the first accumulator to the second accumulator.

16. The method of claim 15, further including:

storing about 50-100 L of fluid having a pressure of about 260-315 bar in the first accumulator; and storing about 10 L of fluid having a pressure of about 5-30 bar in the second accumulator.

17. The method of claim 15, wherein:

the motor is a first actuator; and the method further includes directing fluid discharged from a second actuator to the first and second accumulators.

18. The method of claim 17, further including directing fluid from the pump into the first accumulator.

* * * * *